W. MAREAN.
CAR-BRAKE AND STARTER.
No. 190,056. Patented April 24, 1877.
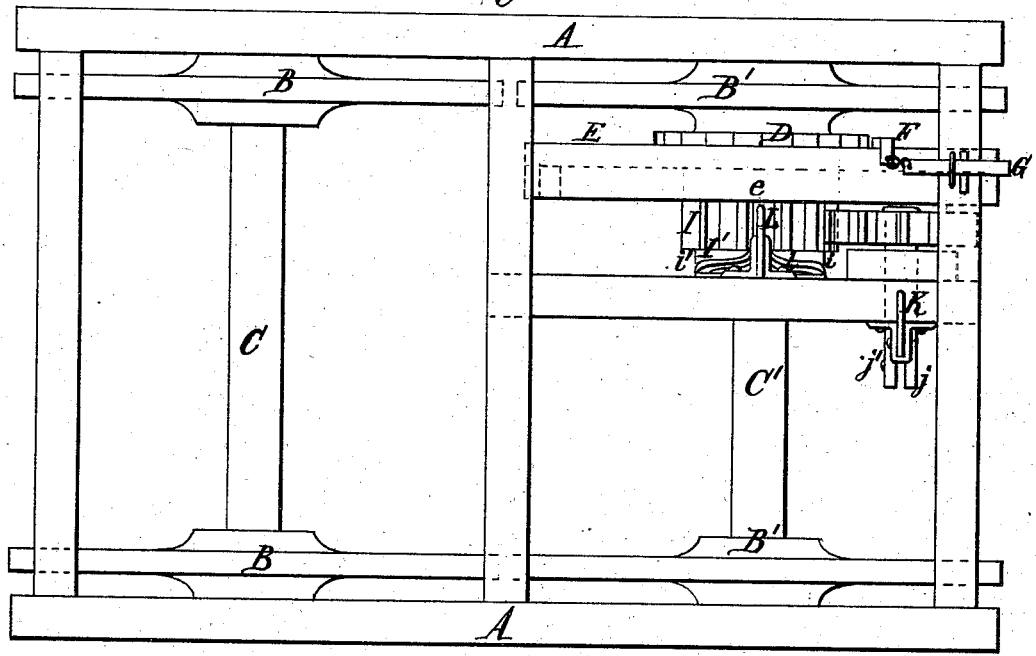
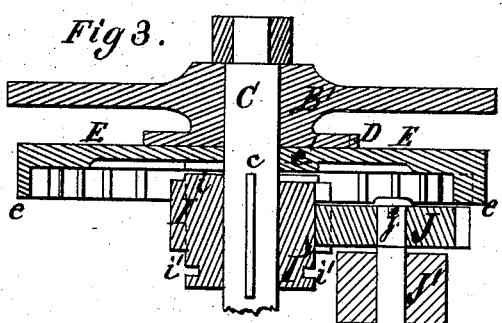
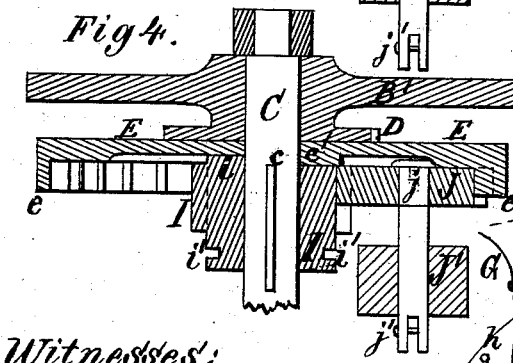
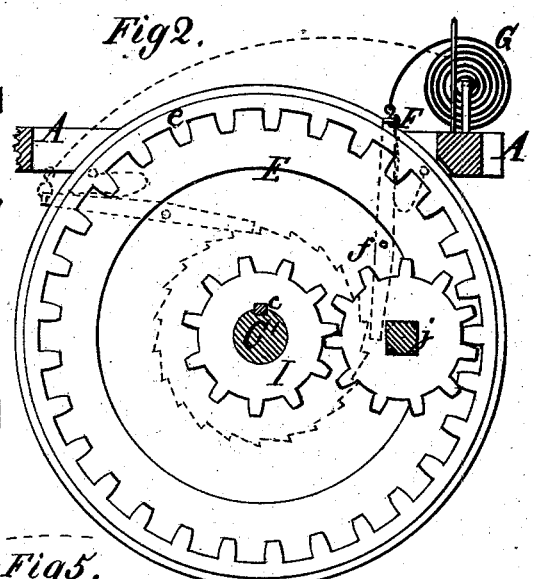
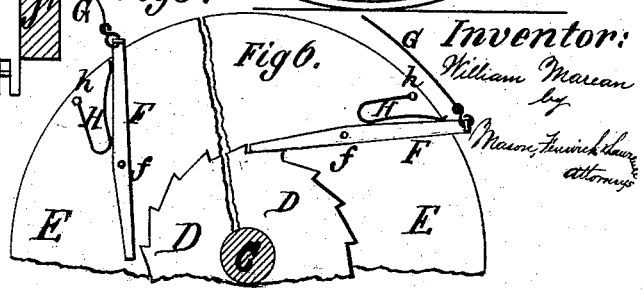

UNITED STATES PATENT OFFICE.

WILLIAM MAREAN, OF GALVESTON, TEXAS.

IMPROVEMENT IN CAR BRAKES AND STARTERS.

Specification forming part of Letters Patent No. 190,056, dated April 24, 1877; application filed March 17, 1877.

*To all whom it may concern:*

Be it known that I, WILLIAM MAREAN, of the city and county of Galveston, in the State of Texas, have invented certain new and useful Improvements in Railroad-Car Brakes, Starters, and Checkers, which improvements are fully set forth in the following specification and accompanying drawings, in which—

Figure 1 is a plan view of my improved car brake, checker, and starter applied to an ordinary car-truck. Fig. 2 is a longitudinal section of the truck, showing my invention in elevation. Figs. 3 and 4 are horizontal central sections of the invention, one view showing the car-wheel free, and the other the same checked. Fig. 5 is a detailed view of the starting pawl-lever in its normal position; and Fig. 6 is a similar view, showing the said pawl-lever in the act of starting the car-wheel.

The nature of my invention consists in certain constructions, combinations, and arrangements of parts, hereafter fully described and specifically claimed, whereby a car-axle is provided with a brake, check, and wheel-starter of very simple construction, and of great strength and effectiveness.

In the drawing, A represents a truck-frame of ordinary construction. B B' are the wheels, and C C' the axles, suitably connected with the said frame. The axle C' has a ratchet-wheel, D, fastened upon it. Next to the said ratchet-wheel is a loose disk, E, with an inner gear, *e*, and a coupling-clutch, *e'*, on its inner side.

The plain side of the disk E is provided with a fulcrum-pin, *f*, and a pawl-lever, F, the outer end of which lever is attached to a spring, G, fastened to the frame A. A bowed spring, H, fastened with its short end to the disk E by means of a pin, *h*, bears with its long end upon the pawl-lever F, and thereby prevents it from engaging with the ratchet-wheel D when the car is backed. The spring H is only strong enough to serve the described purpose, and is overcome by the tension of the spring G as soon as the disk E revolves. Opposite to the clutch *e'* a matching clutch, *i*, is fastened to a wheel, I, which slides longitudinally upon the axle C', and is caused to revolve with it by means of a key, *c*. An intermediate wheel, J, upon a sliding stud, *j*, is made to gear into the wheel I and the inner gear *e* of the disk E. The stud *j* is supported by a bearing, J', suitably fastened to the frame A of the car, and a hand-lever, K, is, by means of a pin, *j'*, connected with the stud *j*, whereby the driver of the car is enabled to move the wheel J in and out of gear with the wheel I and the inner gear *e*.

The wheel I is provided with an elongated hub, I', and an annular groove, *i'*, in which latter the forked end *l* of a hand-lever, L, is fitted, whereby the car-driver may move the wheel I, with its clutch *i*, toward or from the clutch *e'* of the disk E.

The wheel I is made broad enough to keep constantly in gear with the wheel J at any position they may be changed to.

Operation: When the car is running the clutches *i* and *e'* are disengaged from each other, and the wheel J is moved out of gear with the inner gear *e*, as seen in Fig. 3. The pawl-lever occupies a position (shown in Fig. 5) disengaged from the ratchet-wheel D.

When the car is to be stopped the operator moves the wheel J in gear with the inner gearing *e*, and the disk E revolves in a direction opposite to that of the wheels B B', taking the pawl-lever F along with it. The spring G becomes thereby unwound and strained, and the pawl-lever is consequently pressed upon the ratchet-wheel D, as seen in Fig. 6, gliding over its ratchets. When the car stops the ratchet-wheel D arrests the back motion of the pawl-lever F, and the spring G is prevented from unwinding by the wheel J, which acts as a lock between the disk E and the wheel I.

When the car is to be started the wheel J is disengaged from the inner gearing *e*, and the spring G, in winding itself up, again forces the ratchet-wheel D and the wheels B' forward, thereby giving the car a starting motion. The lever F now resumes its old position again, as seen in Fig. 5.

In case an absolute stopping or checking of the wheels B is desired, the clutches *i* and *e'* and the wheel J and the inner gearing *e*, are engaged together by means of the levers L and K, and the axle C' is locked between the said clutches and the wheels I and J and the inner gearing of the disk E without disturbing the spring G.

What I claim as new, and desire to secure by Letters Patent, is—

1. The combination of the ratchet-wheel D, the disk E, having an inner gear, $e$, and a pawl-lever, F, the spring G, the horizontal sliding wheel J, and the driving-wheel I, all for the purpose of unwinding the spring G and starting the car-wheel, substantially as set forth.

2. The ratchet-wheel D and disk E, provided with an inner gear, $e$, a clutch, $e'$, and pawl-lever F, and the axle C', having a straight-sided key, $c$, in combination with the sliding driving clutch-wheel I, the intermediate wheel J, which slides longitudinally upon the axle $j$, and the independent operating-levers, whereby both the starting and checking of the car are effected, substantially as described.

Witness my hand in the matter of my application for a patent for an improved car starter and checker this 12th day of March, 1877.

WILLIAM MAREAN.

Witnesses:
  STAN. S. JONES,
  J. MARR.